(12) United States Patent
Udupa et al.

(10) Patent No.: US 8,050,473 B2
(45) Date of Patent: Nov. 1, 2011

(54) SEGMENTATION METHOD USING AN ORIENTED ACTIVE SHAPE MODEL

(75) Inventors: Jayaram K. Udupa, Audubon, PA (US); Jaimin Liu, Rockville, MD (US)

(73) Assignee: The Trustees Of The University Of Pennsylvania, Philadelphia, PA (US)

( * ) Notice: Subject to any disclaimer, the term of this patent is extended or adjusted under 35 U.S.C. 154(b) by 932 days.

(21) Appl. No.: 12/030,443

(22) Filed: Feb. 13, 2008

(65) Prior Publication Data

US 2008/0205721 A1 Aug. 28, 2008

Related U.S. Application Data

(60) Provisional application No. 60/901,411, filed on Feb. 13, 2007.

(51) Int. Cl.
*G06K 9/00* (2006.01)
*G06K 9/34* (2006.01)
*G06K 9/32* (2006.01)
*G01N 23/00* (2006.01)

(52) U.S. Cl. ........ 382/128; 382/131; 382/173; 382/294; 378/20

(58) Field of Classification Search .................. 382/128, 382/132, 164
See application file for complete search history.

(56) References Cited

U.S. PATENT DOCUMENTS

| | | | | |
|---|---|---|---|---|
| 5,926,568 | A * | 7/1999 | Chaney et al. | 382/217 |
| 7,382,907 | B2 * | 6/2008 | Luo et al. | 382/128 |
| 2008/0205716 | A1 * | 8/2008 | Von Berg et al. | 382/128 |

OTHER PUBLICATIONS

Behiels, G. et al., "Active Model-Based Segmentation of Digital X-ray Images," in Lecture Notes in Computer Science, Springer Verlag: Germany, pp. 128-137, 1999.
Cohen: "On Active Contour Models and Balloons," Computer Vision, Graphics, and Image Processing: Image Understanding, 53(2), 211-218, 1991.
Cootes, T.F. et al., "Active Appearance Models," IEEE Transactions on Pattern Analysis and Machine Intelligence, 23(6), 681-685, 2001.
Cootes, T.F. et al., "Active Appearance Models," in Proceedings of the European Conference on Computer Vision, 2, 484-498, 1998.
Cootes, T.F. et al., "Active Shape Models Their Training and Application," Computer Vision and Image Understanding, 61, 38-59, 1995.
Cootes, T.F. et al., "Statistical Models of Appearance for Computer Vision," Wolfson Image Anal. Unit, University of Manchester. U.K. Technical Report, 1999.
Cootes, T.F. et al., "The Use of Active Shape Models for Locating Structures in medical Images," Image Vision Computing, 12, 355-366, 1994.
Duta, N. et al., "Segmentation and Interpretation of MR Brain Images: A Improved Active Shape Model," IEEE Transactions on Medical Imaging, 17, 1049-1067, 1998.

(Continued)

*Primary Examiner* — Brian Q Le
*Assistant Examiner* — Jose M Torres
(74) *Attorney, Agent, or Firm* — Woodcock Washburn, LLP

(57) ABSTRACT

An improved method of segmenting medical images includes aspects of live wire and active shape models to determine the most likely segmentation given a shape distribution that satisfies boundary location constrains on an item of interest. The method includes a supervised learning portion to train and learn new types of shape instances and a segmentation portion to use the learned model to segment new target images containing instances of the shape. The segmentation portion includes an automated search for an appropriate shape and deformation of the shape to establish a best oriented boundary for the object of interest on a medical image.

16 Claims, 11 Drawing Sheets

OTHER PUBLICATIONS

Falcao, X. et al., "User-Steered Image Segmentation Paradigms: Live Wire and Live Lane," Graphical Models and Image Processing, 60, 233-260, 1998.

Ginneken, B.V. et al., "Active Shape Models Segmentation with Optimal Features," IEEE Transactions on Medical Imaging, 21(8), 924-933, 2002.

Ginneken, B.V. et al., "Interactive Shape Models," in Proceedings of SPLB, Image Processing, 5032, 2003.

Grzeszezuk, R. et al., "Brownian Strings: Segmenting Images with Stochastically Deformable Contours," IEEE Transactions on Pattern Analysis and Machine Intelligence, 19(10), 1100-1114, 1997.

Hamameh, G. et al., "Combining Snakes and Active Shape Models for Segmenting the Human Left Ventricle in Behocardiographic Images," in Computers in Cardiology, Piscataway, NJ, IEEE, pp. 115-118, 2000.

Kass, M. et al., "Snakes: Active Contour Models," International Journal of Computer Vision, 1, 321-331, 1987.

Langs, G. et al., "ASM Drive Snakes in Rheumatoid Arthritis Assessment," in Proceedings of Image Analysis of 13$^{th}$ Scandinavian Conference, pp. 454-461, 2003.

Liang, J. et al., "United Snakes," Medical Image Analysis, 10(2), 215-233, 2006.

Lobregt, S. et al., "A Discrete Dynamic Contour Model," IEEE Transactions on Medical Imaging, 14(1), 12-24, 1995.

McInerney, T. et al., "Topologically Adaptable Snakes," Processing of the International Conference on Computer Vision, pp. 840-845, Jun. 20-23, 1995.

Mortensen, E.N. et al., "Interactive Segmentation with Intelligent Scissors," Graphical Models and Image Processing, 60, 349-384, 1998.

Mortensen, N. et al., "Adaptive Boundary Detection Using Live-Wire Two-Dimensional Dynamic Programming," IEEE Proceedings of Computers in Cardiology, pp. 635-638, 1992.

Singh, et al., "Deformable Models in Medical Image Analysis," IEEE Computer Society: Silver Spring, MD, ISBN: 0818685212, 1998.

Smyth, P.P. et al., "Automatic Measurement of Vertebral Shape Using Active Shape Models," in Proceedings of the British Machine Vision Conference, pp. 705-714, 1996.

Solloway, S. et al., "Quantification of Articular Cartilage from MR Images Using Active Shape Models," in Proceeding of European Conference on Computer Vision, 2, 400-411, 1996.

Solloway, S. et al., "The Use of Active Shape Models for Making Thickness Measurements from Mr Images," in Proceedings of the 4th European Conference on Computer Vision, pp. 400-412, 1996.

Sozou, P. et al., "A Nonlinear Generalization of Point Distribution Models Using Polynomial Regression," Image Vision Computing, 13(5), 451-457, 1995.

Udupa, J.K. et al., "A framework for evaluating image segmentation algorithms", Computerized Medical Imaging and Graphics, 30, 75-87, 2006.

Vogelsang, F. et al., "Model Based Analysis of Chest Radiographs," in Proceedings of SPIE, 3979, 1040-1052, 2000.

Yuille, A.L. et al., "Feature Extraction from Faces Using Deformable Templates," International Journal of Computer Vision, 8(2), 99-112, 1992.

* cited by examiner

Example Oriented Active Shape Model Method Training

Example Oriented Active Shape Model Method for Segmention

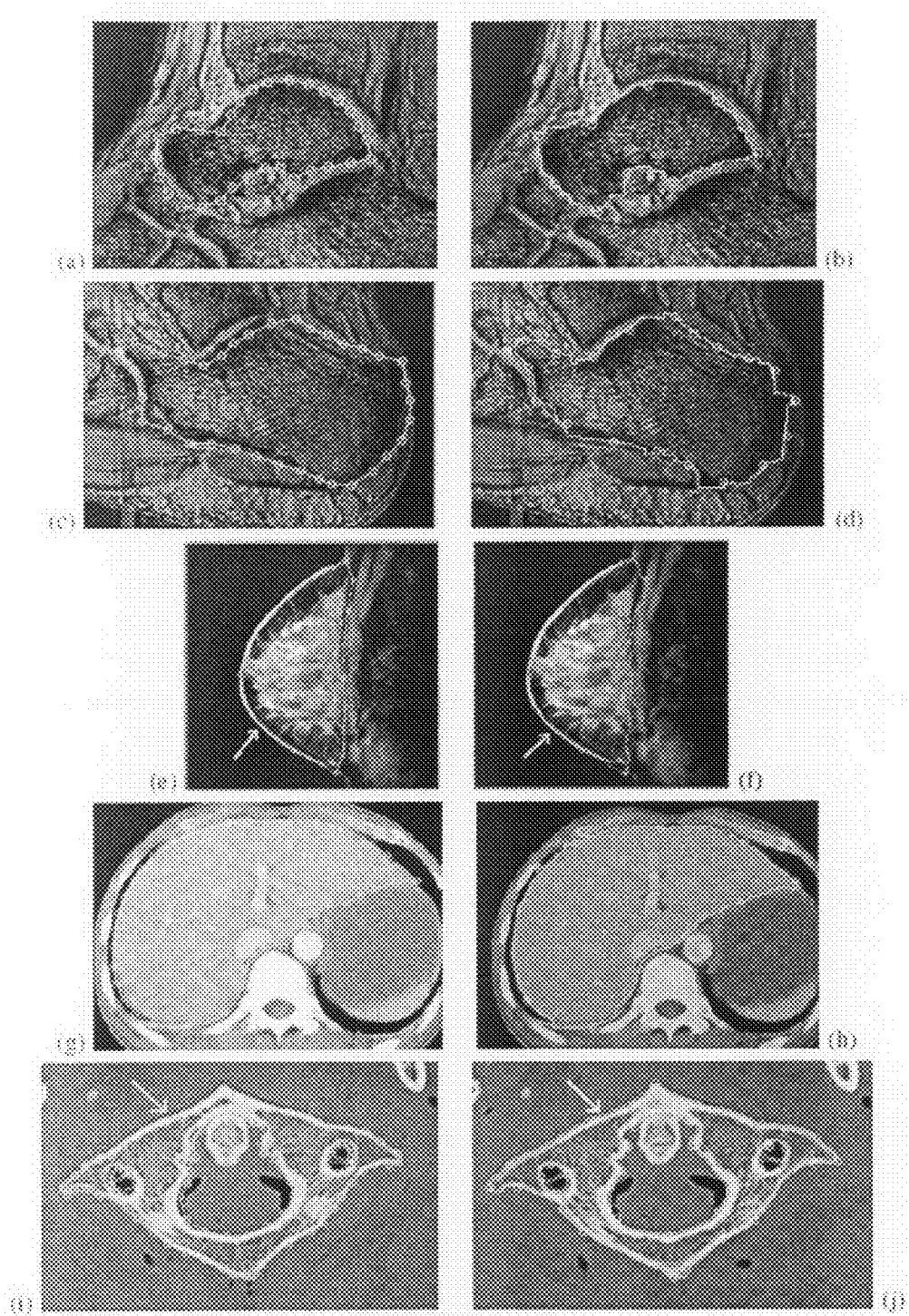
Figures 7 (a)- (j)

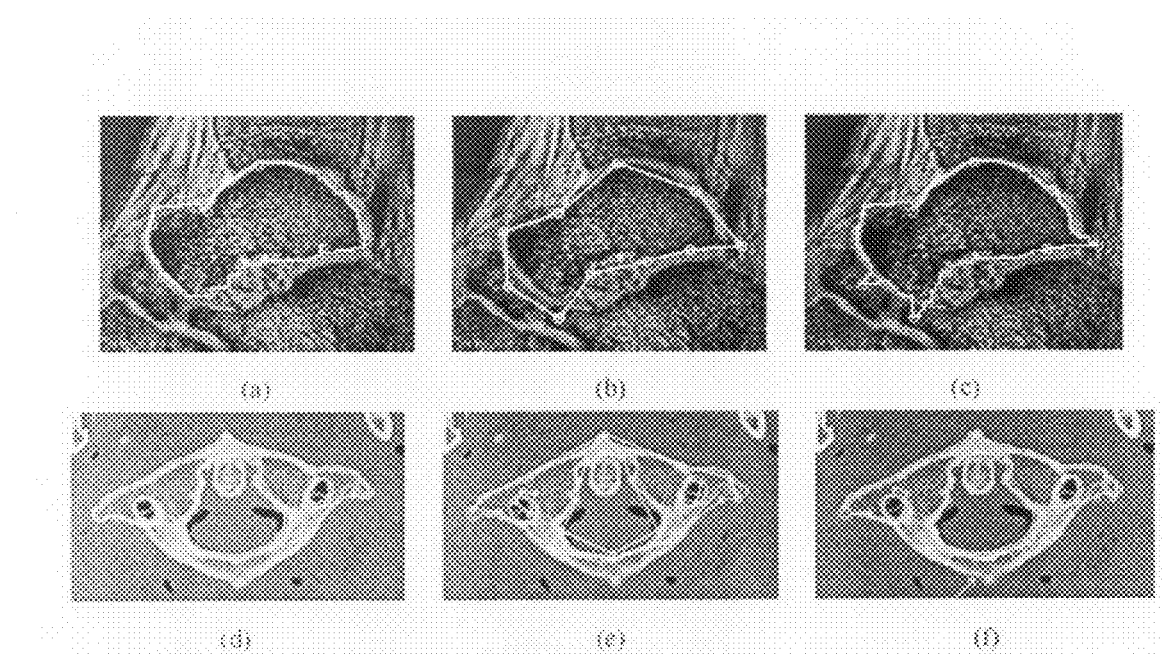
Figures 9 (a) – (f)

SEGMENTATION METHOD USING AN ORIENTED ACTIVE SHAPE MODEL

CROSS-REFERENCE TO RELATED APPLICATION

This application claims priority to U.S. provisional application No. 60/901,411 filed Feb. 13, 2007 entitled "Live Wire Active Shape and Oriented Active Shape Models for Model-Based Optimal Boundary Detection", which is incorporated herein by reference in its entirety.

FIELD OF THE INVENTION

The present invention is directed to segmentation of image data. Specifically, the present invention is directed to a method for automatic segmentation of medical image data using the synergistic combination of an active shape model, a live wire method, and a dynamic programming algorithm.

BACKGROUND

Image segmentation is one of the most challenging problems faced by many medical imaging applications despite four decades of advance in the field. Segmentation methods should produce accurate, repeatable, and efficient segmentations of medical images which will lead to more effective visualization, manipulation and analysis of anatomic structures (objects). Segmentation consists of two tightly coupled tasks; recognition and delineation. Recognition is the process of identifying roughly the whereabouts of a particular object of interest and distinguishing it from other objects present in the image. Delineation is the process of specifying the precise spatial extent of the object.

Existing methods to delineate the boundary of objects suffer from several limitations. Purely model-based segmentation methods require that a template shape be placed quite close to the object to segment. Other methods have insufficient accuracy in detecting the border of the object or require many manually placed landmarks. One well known segmentation method is the Active Shape Models (ASM) method.

ASM-based approaches have been used in several segmentation tasks in medical imaging. However, in practice, ASM methods still face four main difficulties: (1) Since the segmentation results are parametric descriptions of the identified shape, they often poorly match the perceptually identifiable boundary in the image. Contour segments between landmarks still need to be determined. These inaccuracies pose problems for the subsequent analysis of medical images. (2) In order to model the shape reasonably well, the ASM needs many landmark points and training samples to represent the shape and its variation. This is costly and time consuming in the training phase. In some cases, sufficient training samples are not available. (3) Due to the local search strategy, ASM segmentation results are sensitive to the search region around each landmark point. If the region is too small, the ASM may not reach the true boundary. If the region is too large, the landmark is misplaced on a similar looking boundary, and part of the contour may be attracted towards a neighboring structure. (4) Also due to the local nature of the search strategy, the ASM approaches are sensitive to inaccurate initialization and may not converge to a correct segmentation. (5) More importantly, by nature, model based matching has to rely on matching (blurred) statistical information in the model to the given image. Therefore the specific information present in the given image cannot be made use of in a specific manner as in purely image based strategies. This affects how best landmark positions can be determined on a given image, and thus has consequences also on items (1)-(4) above. It is desired to realize an approach that can improve on the ASM methods by improving the accuracy of a segmentation process while reducing the total amount of human interaction. The present invention addresses these concerns and others.

SUMMARY

An embodiment of the present invention includes interactive segmentation of medical image slice data using a computer. The method includes training steps wherein a set of initial landmarks is placed on a boundary of an object of interest on a training shape in each of a set of slice images and the generation of an active shape model using the initial landmarks. The live wire cost function is trained by tracing a number of typical boundary segments. The segmentation of a target image slice is then performed by recognizing the shape of a target object of interest in the slice by applying the active shape model together with the live wire cost to determine what location in the slice yields the smallest cost contour. At this location, the landmarks of the shape model are adjusted to yield an oriented contour of smallest total cost. A new shape is then generated that represents the target object using the new landmarks, and the new shape of the target object is displayed on the target medical image slice that closely conforms with the boundaries of the target object.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

BRIEF DESCRIPTION OF THE DRAWINGS

In the drawings:

FIGS. 7(a)-(j) depicts segmentation comparisons using ASM and OASM;

FIGS. 9(a)-(f) depict a comparison of ASM and OASM using the same number of landmarks.

DETAILED DESCRIPTION

Exemplary Embodiments

Overview

Figure 1:
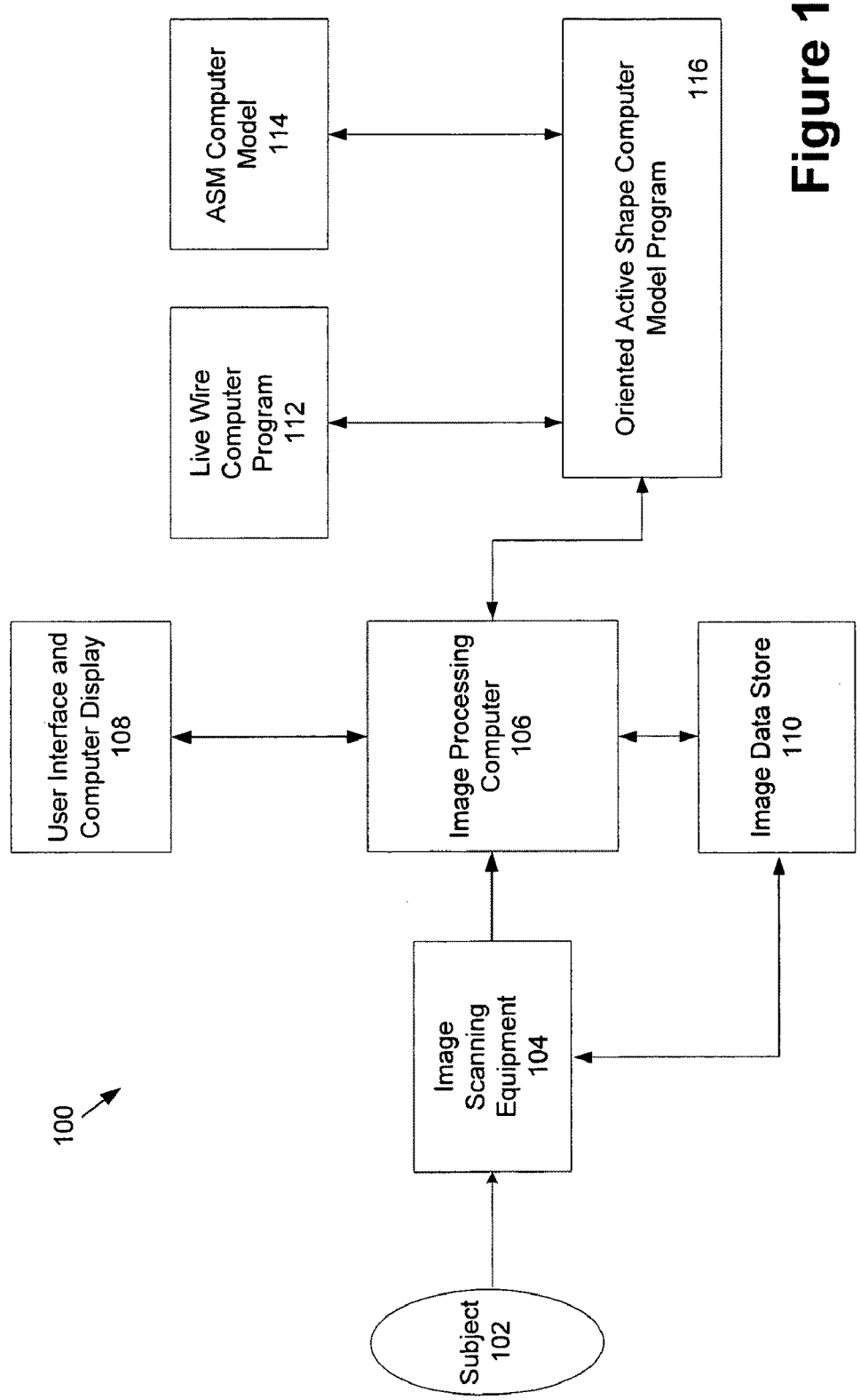
FIG. 1 is a block diagram depicting a system having elements of the present invention.

FIG. 1 depicts one embodiment in which aspects of the present invention may be realized. The image acquisition and processing system 100 of FIG. 1 includes image scanning equipment 104, such as a magnetic resonance imaging (MRI)

scanner or computerized tomography (CT) scanner that images a subject 102 to produce a volume of image data in the form of a plurality of individual image slices. The entire set of image slices makes up the entire volume of the subject. The number of slices may vary from a few dozen to thousands of image slices. The image slices may be stored in the image data store 110 as raw images. These raw images can be referred to as pre-processed image data.

Post-processing of image data can take many forms. In one embodiment, the image processing computer 106, in conjunction with a user interface 108, uses the raw image data stored in 110 to produce more usable forms of image slice data. Image data store 110 may be arranged to segregate post-processing data from raw data. In another aspect, the post processing data can include both training set data and target image data such that the data are stored either together or separately. Image data store 110 may include multiple forms and partitions of storage as is well known in the art. In the embodiment of FIG. 1, there is a new computer program 116 termed an oriented active shape model (OASM). The OASM may take the form of a computer program stored either in memory within the computer 106 or residing on a magnetic computer-readable storage medium, such as magnetic diskette or tape media, or on optical computer-readable storage medium such as CD or DVD, or on semiconductor computer-readable storage medium, such as flash memory, ROM, RAM, or other semiconductor-based media. The OASM utilizes the existing programs of live wire 112 and an active shape model 114, (also available on the same or different media), along with a new technique, to post-process the raw image data to fully extract information from the image slice data. The post-processed medical image slice data can then be stored in the image data store and retrieved to more easily serve as an analysis tool for the subject of interest.

The approach to overcome the presently known drawbacks of ASM includes improvements to current two-dimensional segmentation problems. The new strategy that the current invention presents is termed Oriented Active Shape Models (OASM). The OASM consists of two main stages: (1) training and model creation; (2) searching, or segmenting a given image by using the model. OASM differs from ASM mainly in stage (2), although it contains some modifications and new elements in stage (1) as compared to ASM. As a notation convention for the present invention, the lower case bold Roman x with appropriate subscripts is used to denote shapes, the lower case non-bold letters with superscripts is used to denote landmarks/points/pixels, and coordinates are denoted by lower case italic x and y with appropriate subscripts. For a given physical object O, such as the talus bone of the human ankle, OASM can perform segmentation of boundaries of O in a particular image slice of medical data. OASM uses ASM to capture the statistical variations in the boundary of O within O's family via a statistical shape model M. OASM determines a cost structure K associated with M via the principles underlying the well-known live wire method of segmentation. As per this cost structure, every shape instance x generated by M is assigned a total boundary cost K(x) in a given image I. This cost is determined from the live wire segments generated in I between all pairs of successive landmarks of the shape instance x. OASM seeks that oriented boundary in I, which is a sequence of live wire segments between successive pairs of landmarks of a shape instance $x_o$, such that $x_o$, satisfies the constraints of M, and the cost $K(x_o)$ in I is the smallest possible. The main steps involved in OASM method are training and model creation steps as well as searching and segmentation steps. The training and model creation steps include (T1) specifying landmarks on training shapes, (T2) constructing the model M, and (T3) creating the boundary cost function K. The searching and segmentation steps include (S4) automatic initialization, (S5) finding the shape x representing the best oriented boundary in the given image I, and (S6) outputting the best oriented boundary found in step S5.

Method Step Details

The first step, training step T1, involves specifying landmarks on a slice of a medical image. One way to describe a shape of an object of type O is by locating a finite number (n) of points on its boundary, referred to as landmarks. A landmark is a homologous point of correspondence on each object that matches within the same population. A mathematical representation of an n-point shape in d dimensions may be obtained by concatenating each dimension into a dn component vector. In a two dimensional (2D) shape, d=2. So the vector representation for planar shapes would then be:

$$x=(x^1,x^2,\ldots x^n)=(x_1,y_1,\ldots x_n,y_n)^T. \quad \text{(Equation 1)}$$

In most ASM studies, a manual procedure is used to label the landmarks in a training set, although automatic methods are also available for this purpose for 2D shapes. That is, for each image of the training set, operators locate the shape visually, and then identify significant landmarks on that shape. It is assumed that the landmarks are accurately located and that there is an exact correspondence between landmark labels in different instances of the training shapes. Manual as well as automatic methods for landmark location may be used.

The second training step, T2, involves the generation of an Active Shape Model (ASM) for the training shapes. To obtain a true shape representation of an object family O, location, scale, and rotation effects within the family need to be filtered out. This is done by aligning shapes within O, in this case, the training set, to each other by changing the pose parameters which include scale, rotation, and translation. Principal component analysis is applied to the aligned shape vectors $x_i$ within O's family by computing the mean shape $$\bar{x} = \frac{1}{N}\sum_{i=1}^{N} x_i \quad \text{(Equation 2)}$$

where N is the number of training shapes utilized from O's family. The covariance among the N shapes, expressed as a matrix S, is:

$$S = \frac{1}{N-1}\sum_{i=1}^{N}(x_i - \bar{x})(x_i - \bar{x})^T \quad \text{(Equation 3)}$$

and the eigenvalues $\lambda_k$ of S and the corresponding eigenvectors $\phi_k$ are generated by $$S\phi_k = \lambda_k \phi_k \quad \text{(Equation 4)}$$

where k=1, 2, ..., 2n, where $\lambda_k$, is the $k^{th}$ eigenvalue of S such that $\lambda_k \geq \lambda_{k+1}$.

Most of the variation in shape within the family of O as represented in the training shapes can usually be captured by a small number t of modes. The number t of eigenvalues to retain is chosen so as to explain a certain proportion p of the variance in the training shapes, usually ranging from 90% to 99.5%. The desired number of modes is given by the smallest t satisfying $$\sum_{i=1}^{t} \lambda_i \geq \frac{p}{100} \sum_{i=1}^{2n} \lambda_i \quad \text{(Equation 5)}$$

A shape instance for the object of type O can then be generated by deforming the mean shape by a linear combination of the retained eigenvectors:

$$x = \bar{x} + \Theta b, \quad \text{(Equation 6)}$$

where $\Theta = (\phi_1 | \phi_2 | \ldots | \phi_t)$ is the matrix of the first t eigenvectors and $b = (\beta_1, \beta_2, \ldots \beta_t)^T$ represents model parameters. The above equation allows generation of new examples of the shapes of O by varying the parameters $\beta_k$ within suitable limits, so the new shape will be similar to those in the training set. Since the variance of $\beta_k$ over the training set can be shown to be $\lambda_k$, suitable limits are chosen, typically, for $1 \leq k \leq t$, $$-3\sqrt{\lambda_k} \leq \beta_k \leq 3\sqrt{\lambda_k} \quad \text{(Equation 7)}$$

Alternatively, one may constrain b to be in a hyperellipsoid, $$D_m^2 = \sum_{i=1}^{t} \left( \frac{\beta_i^2}{\lambda_i} \right) \leq D_t^2 \quad \text{(Equation 8)}$$

where $D_m$ is the Mahalanobis distance from the mean, and $D_t$ is a suitable threshold.

The local appearance that describes the typical image structure around each landmark is obtained from pixel intensity profiles, sampled around each landmark, perpendicular to the contour. The direction perpendicular to a landmark $x^n = (x_n, y_n)$ is computed by rotating the vector that runs from $x^{n-1} = (x_{n-1}, y_{n-1})$ to $x^{n+1} = (x_{n+1}, y_{n+1})$ over 90 degrees. In the current application, all objects are closed contours, so for the first landmark, the last landmark and the second landmark are the points from which a perpendicular direction is computed; for the last landmark, the second to last landmark and the first landmark are used for this purpose.

Suppose, for a given landmark point $x^k$, a sample along a line l pixels on either side of it in the $i^{th}$ training image is taken. Then 2l+1 sample intensities that can be put together in a vector $g'^k_i$ ($1 \leq i \leq N$). To reduce the effects of global intensity changes, the derivative is sampled along this line rather than the absolute gray-level values. By normalizing each sample by dividing through by the sum of absolute element values and repeating this for each training image, a set of normalized intensity (derivative) profiles $\{g_i^k\}$ are obtained for the given landmark point $x^k$. The mean profile $\bar{g}^k$ and the covariance matrix $S_g^k$ are computed for each landmark over the training images. In the ASM approach, $\bar{g}^k$ and $S_g^k$ for $1 \leq k \leq n$, are used in determining how to move each landmark in a given image to be segmented so that the intensity profile $g_s^k$ obtained from the given image matches the model profile as best as possible in the sense of minimizing the Mahalanobis distance $$D(x^k) = (g_s^k - \bar{g}^k)^T (S_g^k)^{-1} (g_s^k - \bar{g}^k) \quad \text{(Equation 9)}$$

In OASM, as described in the next section, this distance information is used in conjunction with the global oriented boundary cost structure to create the OASM. The set of all allowable shapes of O, as determined by Equations (6) and (7), together with the set of all intensity profiles for all landmarks, constitutes the statistical model M of O that is sought. In OASM, M will be modified by creating a boundary cost function.

The third training step, T3, involves creating a boundary cost function related to the model of the training shapes. A live wire method developed by Falcao, Udupa, Samarasekera, Hirsch, and Sharma is used in OASM that has certain distinct advantages over other live wire strategies because of its boundary orientedness properties and because of a distinct graph model it uses. The referenced live wire method is discussed in a paper authored by A. X. Falcao, J. K. Udupa, S. Samarasekera, B. E. Hirsch, and S. Sharma, entitled "User-Steered Image Segmentation Paradigms Live Wire and Live Lane, Graphical Models and Image Processing", 60, (1998), 233-260 incorporated herein in its entirety. A two dimensional (2D) image I can be considered as a pair (I, g), consisting of a finite 2D rectangular array I of pixels called the image domain and a function g(p): I→H called image intensity that assigns to each pixel p in I an intensity value lying in an interval H. A boundary element, (bel), of I is defined as an ordered pair of 4-adjacent pixels. Every bel b=(p, q) of I has a location and an orientation. The location of b is that of the unique edge shared by p and q. Its orientation is assumed to be such that p is always inside the boundary, q is outside the boundary, and the inside is always to the left of b.

Figure 2A:
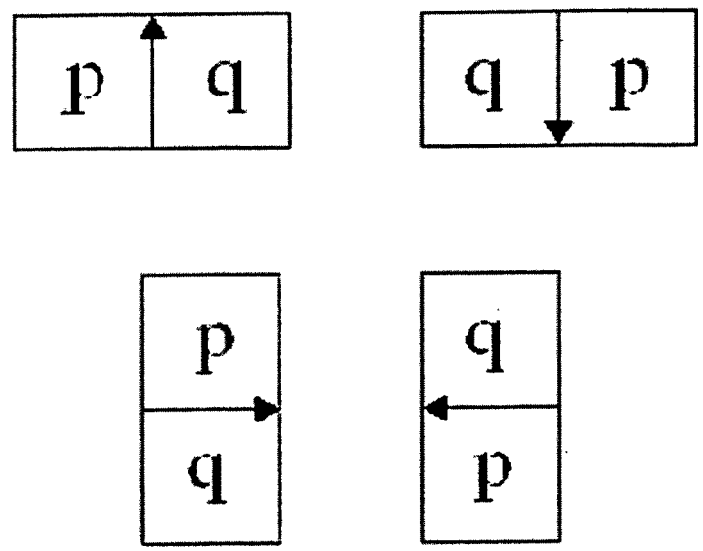
FIGS. 2(b) and 2(a) are a graph model used in finding optimum boundaries for the live wire method and a boundary element oriented pixel edge as used in the live wire method, respectively.
Figure 2B:
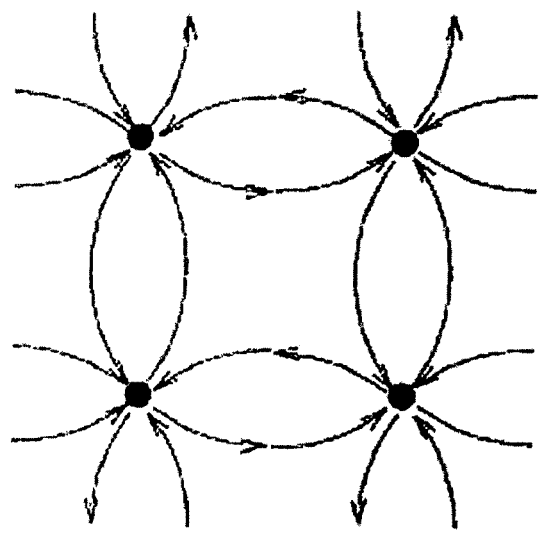

FIG. 2 depicts features of boundary elements and graph models. FIG. 2(a) shows a boundary element (bel) as an oriented pixel edge. The four possible types of bels in an image are shown. The inside of the boundary is to the left of the bel and the outside is to the right. FIG. 2(b) depicts the graph model used in finding optimum boundaries. The nodes in this graph are the pixel vertices and the directed arcs are oriented pixel edges. Note that every physical edge of a pixel corresponds to two different oriented edges represented by two directed arcs going in opposite directions between the same two vertices. Only four nodes are shown in this figure, but the graph is defined over the whole image domain of I.

Any bel of I should be in one of four orientations as shown in FIG. 2(a). A bel is thus an oriented pixel edge. To every bel of I, a set of features is assigned. The features are intended to express the likelihood of the bel belonging to the boundary that is sought in I. The feature values are converted to a single joint cost value c(b) which describes the cost of having b as part of the boundary sought. An object boundary is defined as a closed sequence of bels in I. To every boundary (closed sequence) that is defined in I, a cost is assigned which is simply the sum of the costs of all bels comprising the boundary. The aim is to find a boundary with the smallest total cost.

The problem of finding the boundary with the smallest total cost can be solved elegantly via dynamic programming if translated to a problem of finding a minimum-cost path in a directed graph (see FIG. 2(b)) whose vertices are the vertices of all pixels of I and arcs are the bels of I. The cost function c(b) associated with each bel b of I is a linear combination of the costs assigned to its features, $$c(b) = \frac{\sum_{i=1}^{n} w_i c_f(f_i(g))}{\sum_{i=1}^{n} w_i} \quad \text{(Equation 10)}$$

where $w_i$ is a positive constant indicating the emphasis given to feature function $f_i$ and $c_f$ is the function to convert feature values $f_i(b)$ to cost values $c_f(f_i(b))$. Here, $f_i$s represent features such as intensity on the immediate interior of the boundary, intensity on the immediate exterior of the boundary, and different gradient magnitudes at the center of the bel, $c_f$ is an inverted Gaussian function, and identical weights $w_i$ are used for all selected features. Training to determine c(b) consists of the user tracing several (approximately 3 to 4) typical boundary segments for O in a typical training image (or on a couple of training images). The training algorithm then automatically determines the optimal combination of features and the cost function c(b) from this information.

In the live wire method, an initial point $x^1$ (meaning a pixel vertex) is selected by the user on the boundary of O in I. As the user subsequently moves the cursor to any new point $x^2$, the best (i.e. minimum cost) oriented path as a sequence of bels from $x^1$ to $x^2$ is found in real time and displayed. If the user chooses $x^2$ also on the boundary of O, the best path snaps on to the boundary of O in I. When the user deposits $x^2$, which now becomes the new starting point, the process continues. For the purpose of OASM, the feature of live wire is used that defines the best oriented path between any two points as a sequence of bels of minimum total cost. The only deviation in this case is that the two points will be taken to be any two successive landmarks employed in M, and the landmarks are assumed to correspond to pixel vertices. With this facility, we assign a cost $\kappa(x^k, x^{k+1})$ to every pair of successive landmarks of any shape instance x of M, which represents the total cost of the bels in the best oriented path $<b_1, b_2, \ldots, b_h>$ from $x^k$ to $x^{k+1}$ in I. That is, $$\kappa(x^k, x^{k+1}) = \sum_{i=1}^{h} c(b_i) \quad \text{(Equation 11)}$$

For any shape instance $x=(x^1, x^2, \ldots, x^n)$ of M, the cost structure $K(x)$ associated with M may now be defined as $$K(x) = \sum_{i=1}^{n} D(x^k)\kappa(x^k, x^{k+1})D(x^{k+1}) \quad \text{(Equation 12)}$$

where we assume that $x^{n+1}=x^1$, and $D(x)$ is the Mahalanobis distance for the intensity profiles at x as in Equation (9). That is, $K(x)$ is the weighted sum of the costs associated with the best oriented paths between all n pairs of successive landmarks of shape instance x; Mahalanobis distance for the intensity profiles are used as weights. Thus, once the bel cost function c(b) is determined via training (See the Falcao paper referenced herein above), K is also determined automatically by Equations (9), (11) and (12).

The purpose of the training Steps T1-T3 is to create an OASM for O, which we denoted by the pair (M, K), consisting of a statistical shape model M and an oriented boundary cost structure K. Given the oriented model (M, K) for O and an image I depicting O, the following Steps S4-S6 describe how the boundary of O may be recognized and delineated in I. The boundary orientedness concept allows assigning very different costs to otherwise similar looking boundary segments that come very close. Note that $\kappa(x^k, x^{k+1})$ is generally very different from (much smaller than) $\kappa(x^k, x^{k+1})$, and the two best paths may also be very different.

Figure 3A:
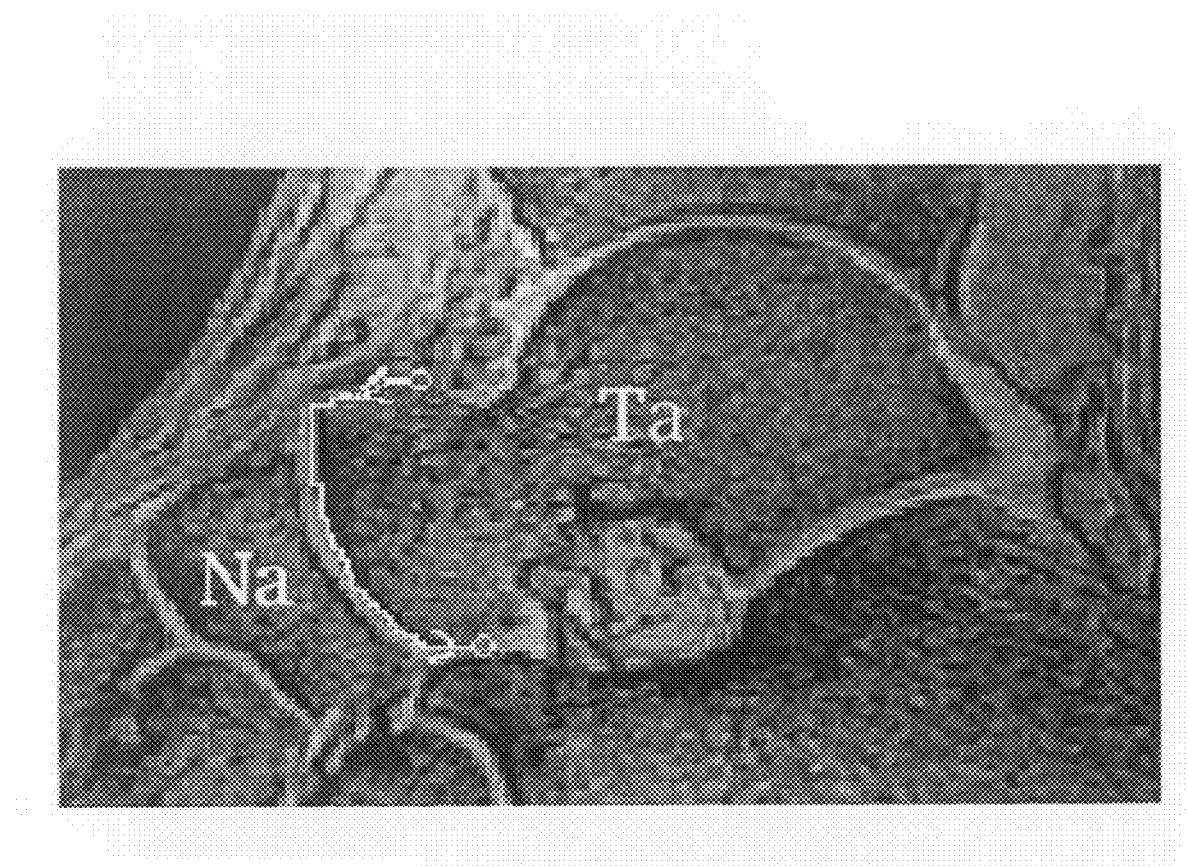
FIGS. 3(a) and 3(b) show oriented boundaries of a talus and navicular foot bones illustrating aspects of the invention.
Figure 3B:
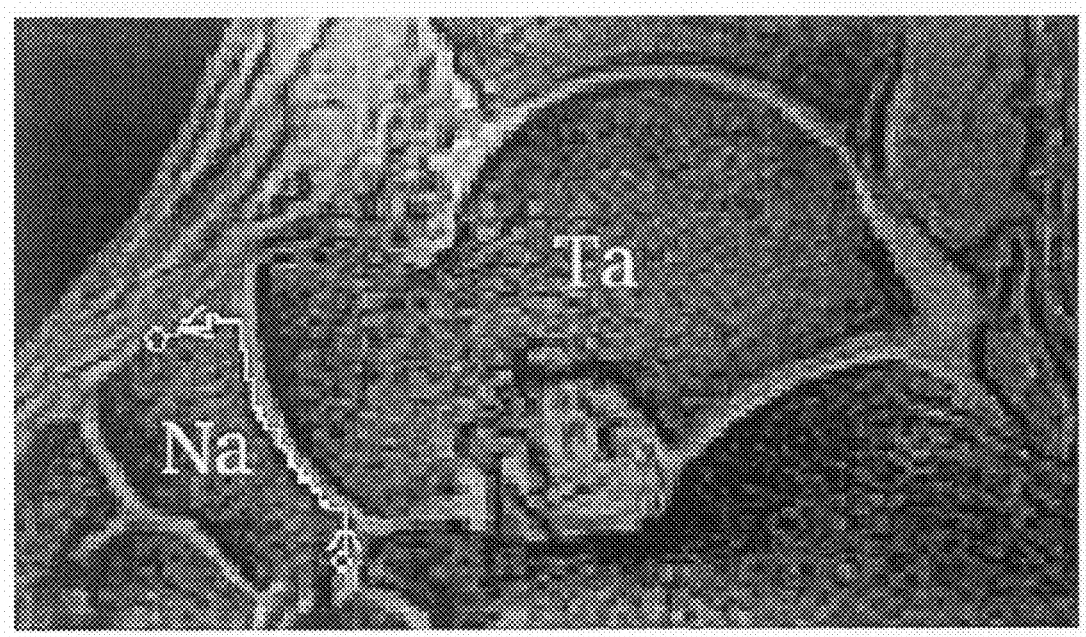

FIGS. 3a and 3b depict oriented boundaries in OASM illustrated via a region of interest selected in an MR image slice of a human foot. The boundary of talus Ta (partly shown in FIG. 3a), running in the counter-clockwise direction, will not be attracted by the nearby boundary of navicular Na (partly shown in FIG. 3b), also running in the counter-clockwise direction, although the two boundaries have very similar properties, because they have opposite orientations locally where they come close together at the talo-navicular joint.

As illustrated in FIGS. 3a and 3b, while detecting the boundary of talus, the bels of navicular that come close to the bels of talus will have much higher cost than the cost assigned to the bels of talus. That is, the boundary of talus tracked and the optimum path determined will not be attracted by the nearby navicular, and vice versa, although the boundaries otherwise appear with very similar intensity properties, and the only difference between them being their orientation. This concept of orientedness of boundary helps OASM substantially in improving both recognition and delineation.

The first searching and segmentation step, Step S4, involves an automatic initialization process that recognizes the desired boundary in I; that is, this step finds a shape instance $x_i$ of M which is sufficiently close to the boundary of O in I that is to be segmented. In later steps, $x_i$ is subsequently deformed to best fit the image information in I. The automatic initialization method step of the OASM method relies on the fact that, at a position of a shape instance x of M that is close to the correct boundary of O in I, the total cost $K(x)$ of the oriented boundary is likely to be sharply smaller than the cost of oriented boundary found at other locations in I. The strategy of this method step then is to evaluate this boundary cost assuming each pixel in the image domain to be such a potential position for the shape, and choose that position for which this cost is the smallest over the whole image domain. In this step, the standard ASM method is employed which consists of accounting for scale and rotation and then adjusting the location of each landmark derived from the training set. Thus, the initial landmarks derived from the training set are automatically superimposed on a target slice. The step then adjusts the location of the transferred landmarks to match the boundaries of the item in the target slice.

For any position $p=(x,y)$ in I, the following operations are carried out: First the mean shape $\bar{x}$ is placed with its center (meaning the mean of the coordinates of the landmarks of $\bar{x}$) at p. Then it is deformed as per the standard ASM method. Let the resulting shape at p be $x_p$. The boundary cost assigned to $x_p$ is then determined by evaluating $K(x_p)$. Finally, that $x_p$ in I for which $K(x_p)$ is the smallest is chosen as the recognized initial shape $x_i$ of O. In our implementation, this testing was done not at every pixel in I but at pixels that were uniformly sampled (at every 1 cm in column and row). Instead of this pseudo exhaustive search, an optimization scheme may also be used. $K(x_p)$ has a very sharp minimum and this should facilitate any optimization scheme to find this minimum effectively. As an aspect of the invention, this automatic method of initialization is used for both OASM and ASM methods used herein.

The second searching and segmentation step, Step S5, involves finding the optimum boundary of an item of interest on an image slice to be segmented. This step assumes that the initialized (recognized) shape $x_i$ derived above is sufficiently close to the actual boundary of O in I. It then determines what the new position of the landmarks of $x_i$ should be such that the sum of the costs of the minimum cost oriented paths between all pairs of successive landmarks is the smallest. This is accomplished through a two-level dynamic programming algorithm (2LDP) as follows. During this process, let the shape to be modified be $x_i=(x^1, x^2, \ldots x^n)$. At each landmark $x^k$, L=2m+1 (m>l, while l is the number of points selected on each side of $x^k$ in the appearance aspect of the model during training) points are selected, including $x^k$, with m points on either side of $x^k$ along a line perpendicular to the shape boundary at $x^k$. Let the set of these points be denoted by $P^k$. From each point in $P^k$, there exists a minimum cost oriented path in I to each point in $P^{k+1}$, which can be determined via (a first level) DP as in the live wire method. One selected set of minimum cost paths between each pair (pk, pk+1) is of interest where the resulting boundary is continuous, and its total cost is the smallest possible. This problem can be solved via a 2nd level of DP as illustrated in the graph of FIG. 4.

Figure 4:
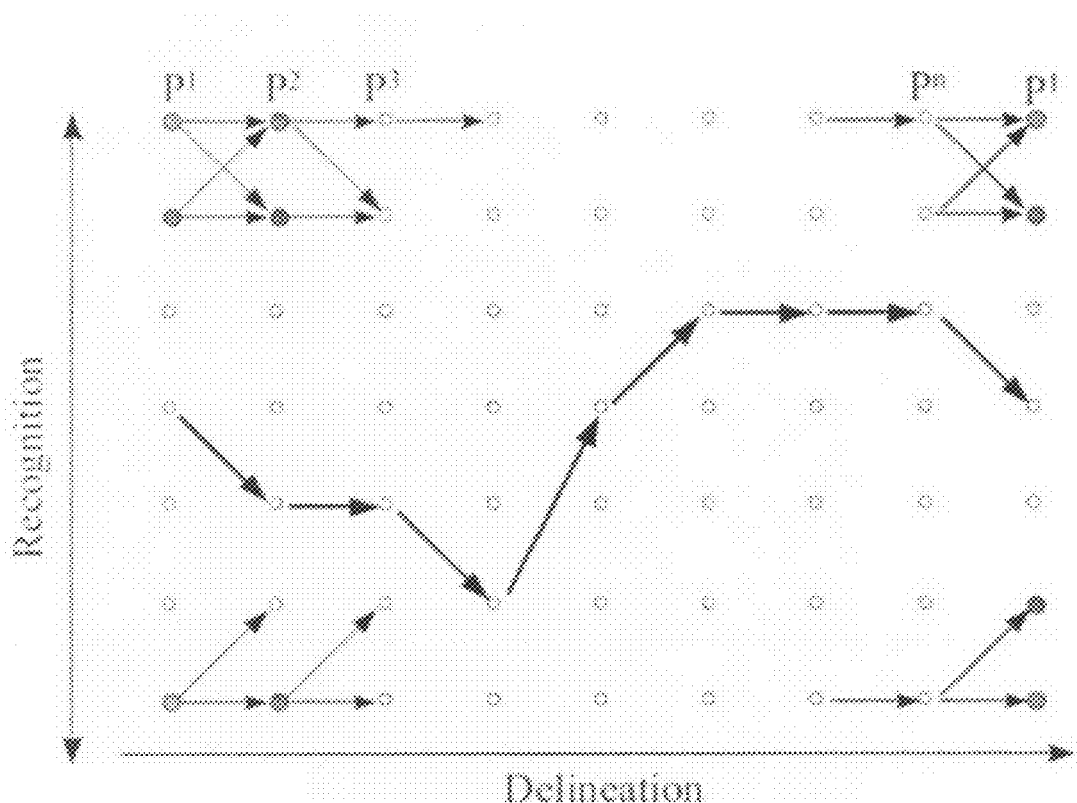
FIG. 4 is a graph used in the second level dynamic programming aspect of the invention.

FIG. 4 depicts a matrix of nodes and the graph used in the 2nd level dynamic programming. A closed boundary in I (as a sequence of bels) is represented in this graph by a directed path such as the one shown in the middle of the figure. The vertical direction corresponds to recognition and the horizontal to delineation. In this graph, the set of nodes is $P^1 \cup P^2 \cup \ldots P^n \cup P^1$, and the set of directed arcs is $(P^1 X P^2) \cup (P^2 X P^3) \cup \ldots (P^{n-1} X P^n) \cup (P^n X P^1)$. Each arc (u, v) in this graph has a cost which is simply the cost κ(u, v), See Equation (11), of the minimum cost oriented (live wire) path between u and v in I. Thus each directed arc such as (u,v) also represents an oriented boundary segment from u to v as a sequence of bels. Note that a directed path, such as the one shown in the middle of FIG. 4, starting from some node u in $P^1$ in the first column and ending in the same node u in the last column constitutes a closed, oriented boundary as a sequence of bels.

One objective is to find the best of all such directed paths (closed, oriented boundaries), each starting from some node in the first column and ending in the same node in the last column. This problem can be solved by a 2nd level of DP applied to the graph of FIG. 4 to find the best path from each node u in the first column to the same node u in the last column. Since there are L nodes in the first (and every) column, the 2nd level DP is to be applied L times, and that directed path (equivalently the closed, oriented boundary) among the L paths which yields the lowest total cost is considered to be the best. The vertical direction in this graph represents movement of the landmarks, or recognition (or fine turning of recognition), and the linking from one column to the next column represents finding optimum (live wire) boundary segments, or delineation. The graph of FIG. 4 demonstrates the synergy and coupling that exists between recognition and delineation in the OASM approach.

In summary, the two-level dynamic programming (2LDP) algorithm inputs a shape $x_i=(x^1, x^2, \ldots x^n)$ and I, and outputs a new shape $x_O$, and the associated optimum oriented boundary as a sequence of bels. Initially, the 2LDP algorithm determines sets $P^1, P^2, \ldots, P^n$ of points in I. These sets of points are points automatically selected at an initial landmark that lie along a line perpendicular to the shape of the target item of interest on a slice. A cost κ(u,v) is then determined via first level dynamic programming (DP) for all directed arcs in the graph of FIG. 4. This cost determination calculates a cost for an oriented path of directed arcs relative to each initial landmark. Next, for each point u in $P^1$, the algorithm determines the best (a minimum) directed path from u back to u (i.e. around the item of interest on the slice), the corresponding shape x', and its total cost K(x'). The shape $x_O$ with the lowest K(x') is then found. Finally, the optimum shape $x_O$ is output along with the corresponding oriented boundary.

Figure 5:
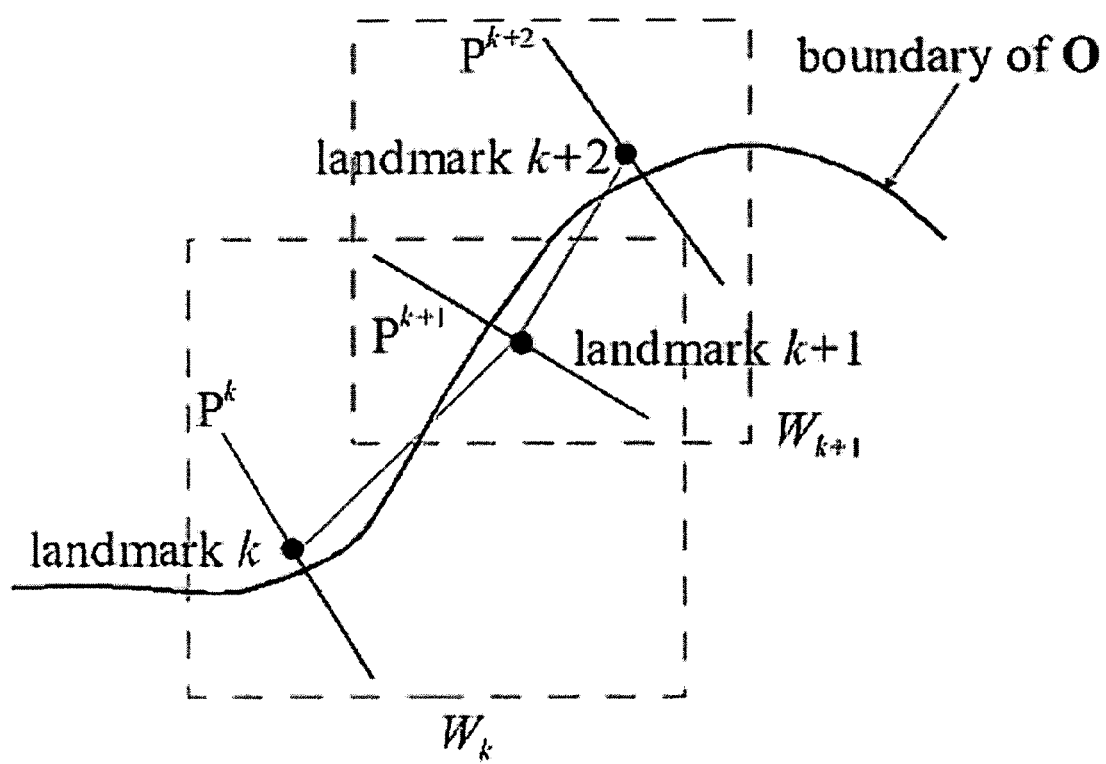
FIG. 5 depicts a subset of an image domain used to speed computations as an aspect of the invention.

To speed up computation, several techniques are used in the implementation of 2LDP. First, the sampled points in sets $P^k$ are determined by nearest neighbor interpolation, and the actual points selected are the nearest pixel vertices. Second, instead of performing the first level DP in the entire image domain I to estimate κ(u,v), it is restricted to a subset of I which is roughly an annular region around the current shape x. This region is taken to be the union of rectangular windows $W_k$, over all k, where $W_k$ is slightly bigger than the smallest rectangle that just encloses $P^k$ and $P^{k+1}$ as illustrated in FIG. 4. That is, when k=n, $P^{k+1}$ is assumed to be the same as $P^1$. Thus, the size of $W_k$ is $(x^k_{max} - x^k_{min} + \delta W)(y^k_{max} - y^k_{min} + \delta W)$ where the x and y coordinates are the maximum and minimum x and y coordinates of the points in $P^k \cup P^{k+1}$, and δW is a constant. FIG. 5 depicts a method to speed up computation in 2LDP. Here, dynamic programming is confined to a subset of the image domain. This subset is a union of rectangular regions determined from every pair of successive point sets $P^k$ and $P^{k+1}$ as described.

The third searching and segmentation step, Step S6 involves testing for convergence of the segmentation. The convergence criterion used here is a measure of the distance between two shapes encountered in two consecutive executions of Step S5. This measure is simply the maximum of the distance between corresponding landmarks in the two shapes. If this distance is greater than 0.5 pixel unit, the optimum shape found in Step S5 is subjected to the constraints of model M (Equations (6) and (7)). Then the iterative process is continued by going back to Step S5. Otherwise, the OASM process is considered to have converged and it stops with an output of the optimum shape and the optimum oriented boundary found in Step S5. In experiments, the inventor has observed that the maximum of the distance between corresponding landmarks in two shapes is almost zero after two iterations if the automatic initialization process brings the shape close to the desired object boundary.

Figure 6A:
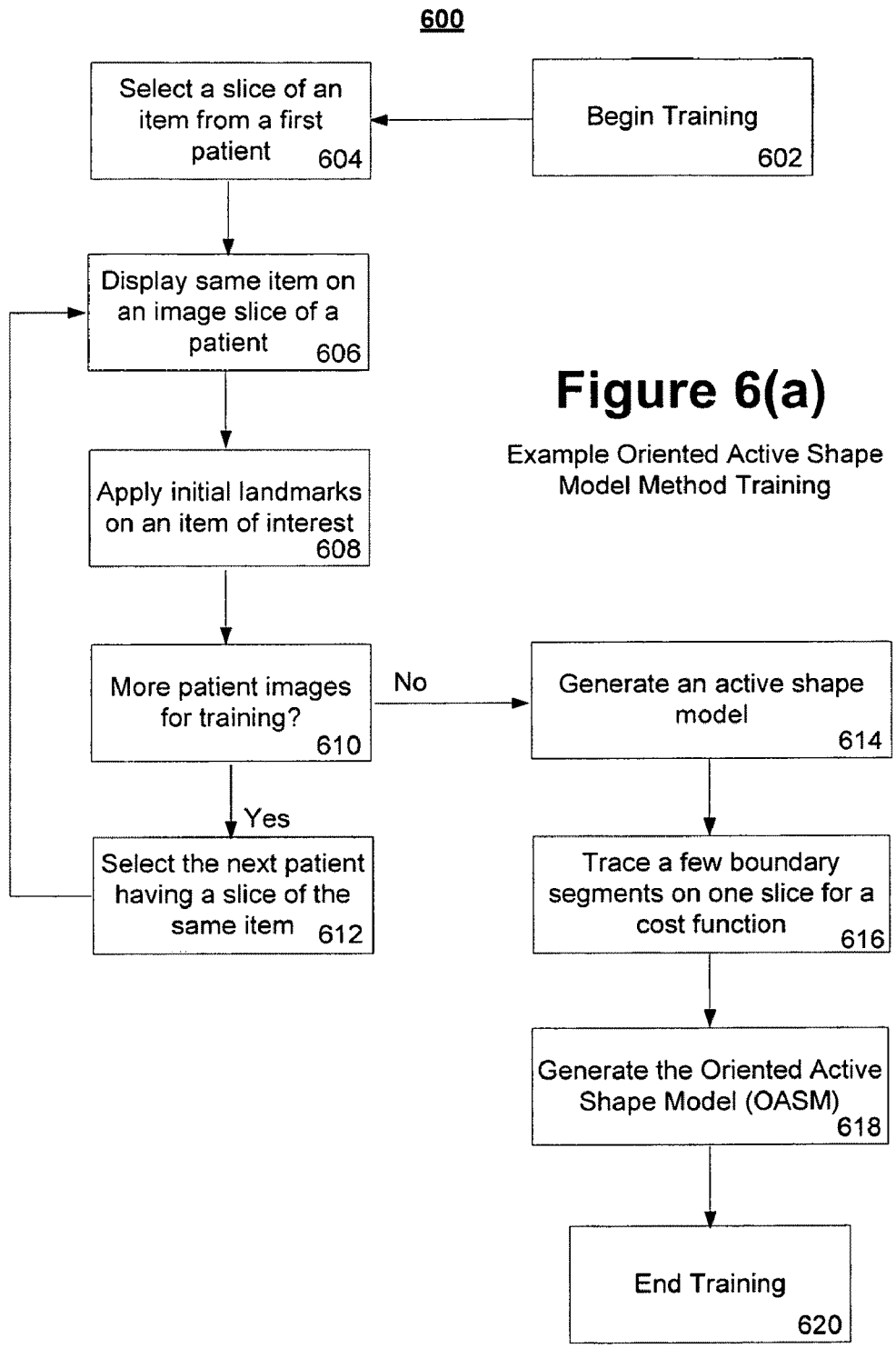
FIG. 6 is a flow diagram of an example oriented active shape model method.

FIG. 6a is an example Oriented Active Shape Model (OASM) training method 600 according to aspects of the invention. The method begins at step 602. Initially, a training object is imaged from different subjects such that a set of digital images is produced. Each digital image is an imaged slice of the training object. The set of digital images is a set of image slices representing the training object. In one embodiment, the object is a medical object, and the slices are individual images taken using magnetic resonance imaging or computer tomography methods. For example, the set of digital images may be talus bone images of different patients. The images are all taken from the same perspective, but taken from different patients. One slice of a medical image from a first patient is selected at step 604. The selected slice is displayed on a computer monitor at step 606. The displayed slice is examined by a computer user and the user applies landmarks to the slice in step 608. The landmarks define the item of interest in the image. As an example, the landmarks applied by the user define boundaries of a talus bone image of a patient. As an alternative, automatic methods of landmark placement may also be used in step 608. Step 610 asks if medical image slices from different patients are available for use as training inputs. If more images are available, then a medical image slice having the same item of interest from a different patient is selected in step 612. then steps 606 through 610 are performed until there are no more images from different patients to consider. Process 600 then moves to step 614 where an active shape model (ASM) is generated to obtain a shape representation of the training item of interest. This step involves changing pose parameters such as scale rotation, and translation as well as using principal component analysis to determine a model for the training shape. At step 616, one of the patient training slices is viewed and a few boundary segments are determined using the live wire program method. The boundary segments are manually traced in order to train a cost function needed for OASM generation. Next, an Oriented Active Shape Model (OASM) method is generated. After the OASM is generated, the training phase is complete for the item of interest in the patient medical slices. In one aspect of the invention, multiple different training objects or items of interest may be analyzed using the method of steps 602-620 in order to develop a library of training objects of interest having different Oriented Active Shape Models for access by later steps.

Figure 6B:
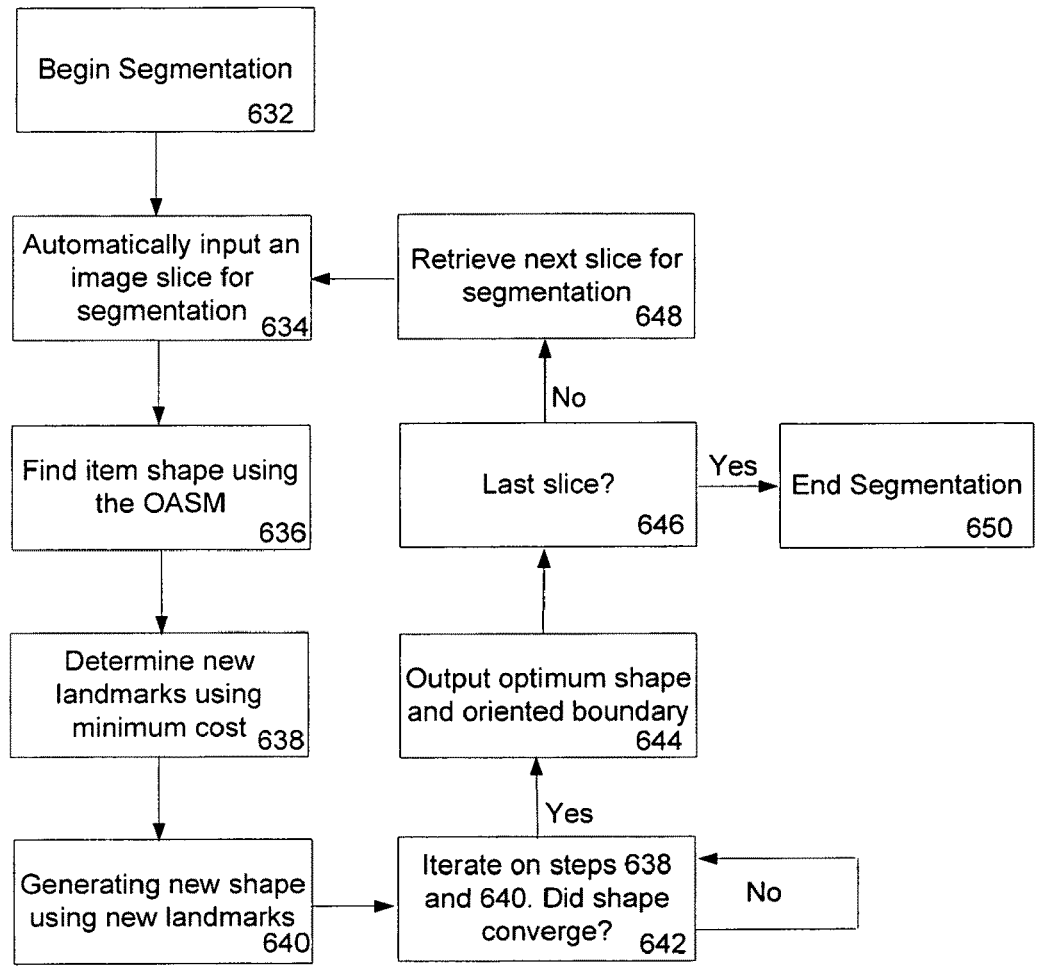

FIG. 6b is an example OASM segmentation method 630. the method begins at step 632 to utilize the OASM model for the item or object of interest developed in the training method 600 of FIG. 6a. It is notable that the methods of FIGS. 6a and 6b may be executed at different times or may be executed in direct tandem. After a training session for a particular item of interest, the OASM developed in FIG. 6a may be used over and over again to perform segmentation (method 630) of the item of interest from new image data from a patient different from or the same as that of the training set of images. The segmentation method 630 begins at step 632 where a medical image slice from a target set of image slices of a single patient is selected. Step 634 automatically inputs a slice from a volume of digital image data representing a target object or item of interest to be segmented. The item shape is found in the slice using an oriented active shape model (OASM) developed at step 618 of FIG. 6a. There may be many OASMs to choose from because a library of OASMs for different items of interest have been generated. In FIG. 6(b), finding the shape involves testing at each pixel of the slice under scrutiny the degree of viability of the pixel as the center of the shape. The degree of viability of any pixel is determined by placing the mean shape at the pixel, performing ASM, performing live wire between successive landmarks, and determining the total cost of the boundary. The pixel that yields a boundary with the smallest cost is considered to be the most viable as the center of the shape. Step 636 represents the recognition part of the method 630. This step involves recognizing a shape of a target object of interest in the input image slice by applying landmarks from the oriented active shape model and automatically specifying an initial position of the target shape on the input image slice. In an environment where multiple OASMs are available, this step also determines which OASM to select based on testing the OASMs for a minimum cost function. In the model selection process at step 636, the OASM with the smallest cost is considered the model of choice to be used by the subsequent steps.

The optimum boundary of the item of interest in the slice is determined in steps 638-640. At step 638, new landmarks are chosen based on the resulting shape selected above via the selected OASM model. The new landmarks are chosen based on a minimum cost algorithm. The new position of the new landmarks is arranged such that the sum of the costs of the minimum cost oriented path between all pairs of successive landmarks is the smallest possible sum. Step 640 generates a new shape using the new landmarks on the target object or item of interest on the displayed slice. Steps 638 and 640 are accomplished using the two-level dynamic programming algorithm (2LDP) discussed above. Step 642 iterates on steps 638-640 and tests for convergence. If the distance between iterations on corresponding landmarks in at least two iterations is smaller than a threshold, such as 0.5 pixels, then the shape has converged and the method 630 moves to step 644. If no convergence is appreciated, then steps 638 and 640 are repeated. Once convergence is realized, then step 644 is taken where the new shape and the associated optimum boundary are output as a sequence of boundary elements (bels). The results at steps 640, 642, and/or step 644 are displayed to the user.

Method 630 of FIG. 6(b) then tests if the last slice in the digital image target set of images is reached at step 646. If the last slice is completed, then the method 630 ends at step 650. If another slice is available, then the method moves to step 648 where the next image slice of a target image data set for the same patient is selected for insertion into step 634. Eventually, all slices in the target data set are processed and the method 630 terminates.

Experimental qualitative and quantitative results from the application of the OASM method compared to the ASM method are presented herein below. The results demonstrate both qualitatively, through image display, and quantitatively, through evaluation experiments, the extent of effectiveness of the OASM strategy. Five different anatomic objects O—talus and calcaneus of foot in MR images, liver in CT images, breast in MR images, and the first cervical vertebra (C1) of spine in CT images—have been considered. The method of evaluation, based on the analysis framework established by J. K. Udupa, V. R LaBlanc, Y. Zhuge, C. Imielinska, H. Schmidt, L. Currie, and B. E. Hirsch, in "A framework for evaluating image segmentation algorithms", Computerized Medical Imaging and Graphics, 30, (2006), 75-87, included herein in its entirety, will focus on the analysis of precision, accuracy, and efficiency of OASM as compared to those of ASM. Manual segmentation performed by experts in these different application areas will be considered to constitute a surrogate of true segmentation for assessing the accuracy of the methods.

The image data sets and objects used in the experiments are briefly described in Table I. Foot MR images for Experiments 1 and 2 were acquired on a 1.5 T GE MRI machine, by using a coil specially designed for the study. The imaging protocol used is a 3D steady-state gradient echo sequence with a TR/TE/Flip angle=25 ms/10 ms/25°, image size of 256×256, and a pixel size of 0.55 mm×0.55 mm. The slice orientation was roughly sagittal. Talus and calcaneus are segmented in Experiments 1 and 2, respectively. Breast MR images for Experiment 3 were acquired on a GE 1.5 T MRI scanner with multicoil array echo speed gradient, image size of 512×512, and a pixel size of 0.5 mm×0.5 mm. Liver CT images for Experiment 4 were acquired on a GE CT scanner with an image size of 512×512, and a pixel size of 0.5 mm×0.5 mm. Spine CT image data for Experiment 5 were acquired on a Siemens Volume Zooming Multislice CT scanner with an image size of 512×512 and a pixel size that varied from 0.23 mm to 0.35 mm. The first cervical vertebra is the target object in Experiment 5.

TABLE I

Description of the image data sets used in the five segmentation experiments

| Data set/ Experiment | Object | Image Domain | No. of Images |
|---|---|---|---|
| 1 (MRI) | Talus of foot | 256 × 256 | 40 |
| 2 (MRI) | Calcaneus of foot | 256 × 256 | 40 |
| 3 (MRI) | Breast | 512 × 512 | 40 |
| 4 (CT) | Liver | 512 × 512 | 40 |
| 5 (CT) | Cervical vertebra (C1) of spine | 512 × 512 | 40 |

In each experiment, 40 slices selected from full 3D images, acquired from ten different subjects are used. These slices are approximately at the same location in the body and approximately at the same orientation with respect to the body, so that, for each 0, the 40 2D images in each set can be considered to represent images of a family of objects of same shape. Each image set is divided into a training set and a test set of equal size such that the test set contains images of only those patients whose images are not in the training set. Two to five slices are taken on average from the same subject's data, either from the same 3D image or from different 3D images.

Figure 8:
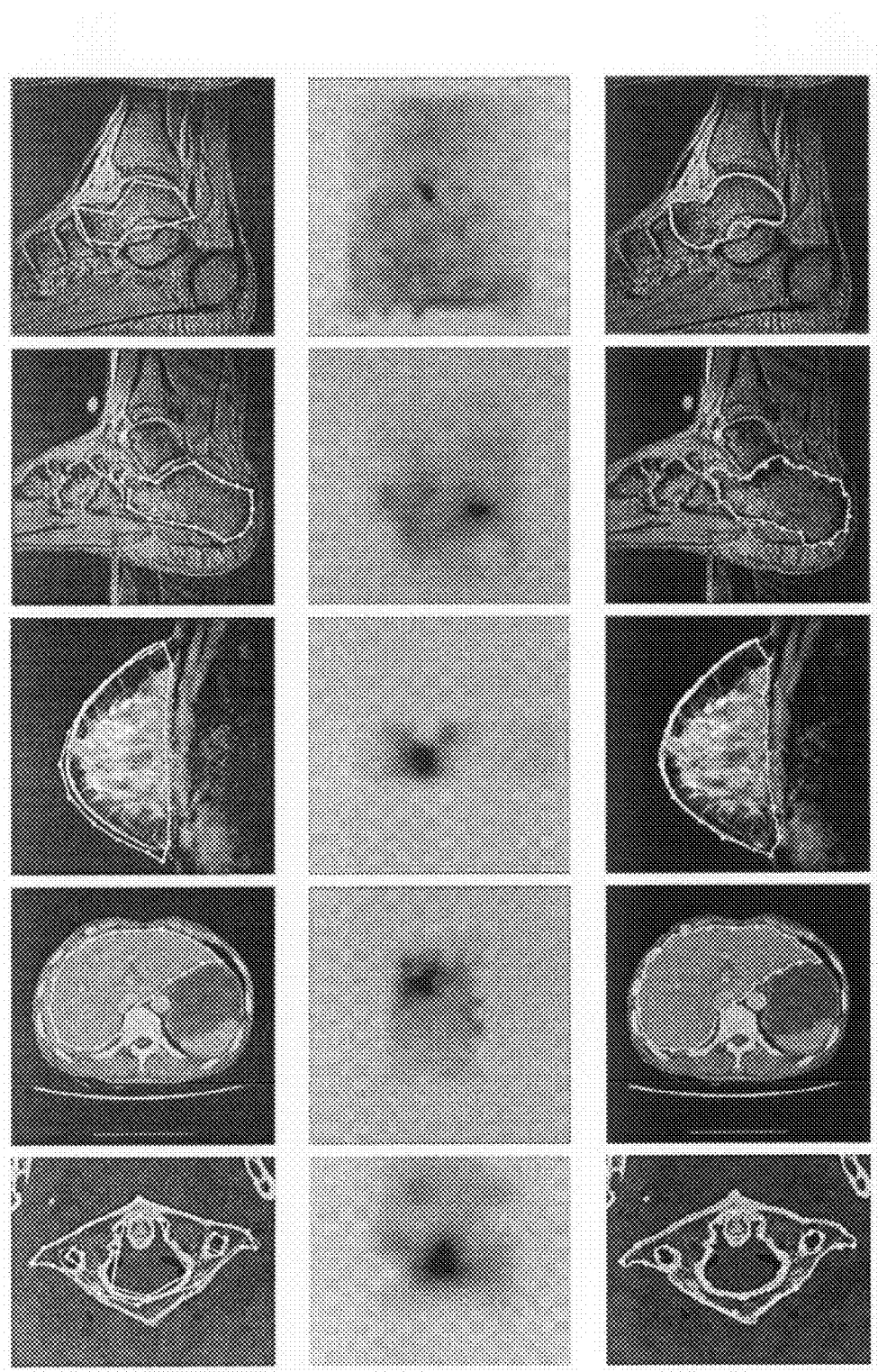
FIG. 8 depicts example shapes resulting from an automatic initialization aspect of the invention.

A subjective inspection revealed that, in all experiments and in all data, the OASM results matched the perceived boundary much better than the ASM results. FIG. 7(a)-(j) presents segmentation examples for ASM (FIG. 7 a,c,e,g,i) and OASM (FIG. 7 b,d,f,h,j) from the five data sets. Placement of the boundary when it is wrong is clear in Figures (a), (c), and (g) for ASM. The wrong aspects of the boundary delineated by ASM in FIGS. 7 (e) and (i) is indicated by arrows. In both FIGS. 7 (e) and (i), the internal rather than the external aspect of the boundary is delineated by ASM. Automatic initialization worked well in all cases in the sense that shapes were found close to the true boundary. Some examples of automatic initialization are displayed in FIG. 8 for the five data sets. Examples of the shapes resulting from automatic initialization in Step S4 of the OASM method for the five data sets appear in the first column of FIG. 8 and the corresponding final OASM segmentations appear in the third column of FIG. 8. Cost structure K(x) as a function of pixel location p used in recognizing shape is depicted in the middle column of FIG. 8. The global minimum is prominently defined in all five data sets as seen by the darkest region in the cost images. The shapes displayed in FIG. 8 are the shapes output by Step S4, which are the initial shapes input to Step S5 of the OASM method, and the final OASM segmentations. FIG. 8 also demonstrates the nature of the cost structure $K(x_p)$ for the different data sets. Here, the value of $K(x_p)$ is displayed as a function of pixel position p over the whole image domain. In the vicinity of p where $x_p$ correctly recognizes the object, $K(x_p)$ is sharply smaller than at other locations. These examples indicate that the automatic method is very effective in recognizing the boundaries.

A different number of landmarks have been chosen for ASM and OASM as summarized in Table II.

TABLE II

The parameters used in ASM and OASM

| Data Set | No. of ASM Landmarks | No. of OASM Landmarks | Other ASM Parameters | Other OASM Parameters |
|---|---|---|---|---|
| (1) Talus | 30 | 10 | L = 3, m = 6 | L = 3, m = 6, $\delta W$ = 10 |
| (2) Calcaneus | 36 | 20 | L = 3, m = 6 | L = 3, m = 6, $\delta W$ = 10 |
| (3) Breast | 18 | 9 | L = 4, m = 8 | L = 4, m = 8, $\delta W$ = 10 |
| (4) Liver | 38 | 17 | L = 4, m = 8 | L = 4, m = 8, $\delta W$ = 10 |
| (5) Cervical Vertebra | 96 | 28 | L = 5, m = 10 | L = 5, m = 10, $\delta W$ = 10 |

The values of other parameters employed in the two methods are also listed in Table II. The numbers of landmarks were arrived at after considerable experimentation. For ASM, these numbers constitute roughly the minimum that gave acceptable results as determined visually. Increasing these numbers will improve the accuracy somewhat, but will call for a considerable increase in the number of training data sets and training time. For OASM, far fewer landmarks are needed for the same level of accuracy. This is because of the boundary orientedness and snapping property of live wire, the 2LDP algorithm, and the synergy established between live wire and ASM. The effect of making the number of landmarks the same in ASM as that of OASM is illustrated in FIG. 9. FIGS. 9 (a),(d) are an OASM result. Figures (b), (e) are an ASM result. FIGS. 9 (c),(f) are an ASM result followed by live wire completion of the optimal boundary segments between successive landmarks. It can be readily seen in FIG. 9 that the accuracy would suffer considerably if the number of landmarks in ASM were reduced to that of the OASM. See FIGS. 9 (b), (e) and (c), (f). FIG. 9 also illustrates that the result of OASM is not merely equivalent to performing ASM first and then finishing off with live wire. OASM really helps in moving the landmarks onto the true boundary. The aspect of finding the initial position of the shape is novel and embodies aspects underlying OASM.

In the analysis framework established by J. K. Udupa, V. R LaBlanc, Y. Zhuge, C. Imielinska, H. Schmidt, L. Currie, and B. E. Hirsch, in "A framework for evaluating image segmentation algorithms", mentioned above, a method's performance is assessed by three sets of measures: precision, accuracy, and efficiency. Precision here refers to the reproducibility of the segmentation results, taking into account all subjective actions that enter into the segmentation process, Accuracy relates to how well the segmentation results agree with the true delineation of the objects. Efficiency indicates the practical viability of the method, which is determined by the amount of time required for performing computations and for providing any user help needed in segmentation. The measures that are used under each of these groups and their definitions are given below. In these analyses, all test data sets from all five groups of data were utilized.

Several factors influence segmentation precision, such as operator subjectivity when input is needed from an operator. With the proposed automatic initialization, no subjective input is needed for both ASM and OASM, and the only factor that can influence repeatability is the search range m. The sensitivity of both methods was tested to the value chosen for m by varying m around the value listed in Table II. Two different values were tested for each data set for both methods. Let $V_1$ and $V_2$ be segmentations (binary images) of the same object in two repeated trials. We use the following definition to measure the overlap agreement to express precision.

$$PR = \frac{|V_1 \cap V_2|}{|V_1 \cup V_2|} \times 100, \quad \text{(Equation 13)}$$

where $\cup$ and $\cap$ represent binary image intersection and union operations, respectively, and |X| denotes the number of 1-valued pixels in X. Table III shows the "search range precision" for the different data sets for the two methods. Mean and standard deviation over the test data sets are displayed. It may be observed from Table III that OASM is less sensitive to search region than the ASM method, and therefore, OASM seems to be more robust than the basic ASM.

TABLE III

Mean and standard deviation of precision for ASM and OASM

| Data Set | ASM Precision | OASM Precision |
|---|---|---|
| (1) Talus | 97.64 ± 0.20 | 99.32 ± 0.19 |
| (2) Calcaneus | 97.13 ± 0.22 | 99.14 ± 0.20 |

TABLE III-continued

Mean and standard deviation of precision for ASM and OASM

| Data Set | ASM Precision | OASM Precision |
|---|---|---|
| (3) Breast | 99.03 ± 0.17 | 99.53 ± 0.15 |
| (4) Liver | 98.23 ± 0.19 | 99.37 ± 0.20 |
| (5) Cervical Vertebra | 97.30 ± 0.20 | 99.44 ± 0.21 |

Of the three factors used to describe the effectiveness of a segmentation method, accuracy is the most difficult to assess. This is due mainly to the difficulty in establishing the true delineation of the object of interest. Consequently, an appropriate surrogate of truth is needed in place of true delineation. Manual segmentation was used to generate a surrogate of truth. In all applications, all data sets have been previously manually segmented by experts in the domain. For any image I=(I, f), let $I_o^b$ be the segmentation result (binary image) output by a method for which the true delineation result is $I_t^b$. The following measures, called true-positive volume fraction (TPVF) and false-positive volume fraction (FPVF) are used to assess the accuracy of the methods. Here the operations on binary images have the obvious interpretations akin to those on sets. TPVF indicates the fraction of the total amount of tissue in the true delineation. FPVF denotes the amount of tissue falsely identified. $I_d$ is a binary image representation of a reference superset of pixels that is used to express the two measures as a fraction. In the present instance, the entire image domain was taken to represent this superset. FNVF and TNVF were defined in an analogous manner. Since these measures are derivable from Equations (14) and (15), TPVF and FPVF are sufficient to describe the accuracy of the method per the analysis framework established by J. K. Udupa, V. R LaBlanc, Y. Zhuge, C. Imielinska, H. Schmidt, L. Currie, and B. E. Hirsch mentioned above and incorporated herein in its entirety.

$$TPVF(I_o^b, I_t^b) = \frac{|I_o^b \cap I_t^b|}{|I_t^b|} \times 100 \qquad \text{(Equation 14)}$$

$$FPVF(I_o^b, I_t^b) = \frac{|I_o^b - I_t^b|}{|I_d - I_t^b|} \times 100 \qquad \text{(Equation 15)}$$

Table IV lists the mean and standard deviation values of TPVF and FPVF achieved in the two experiments by using ASM and OASM methods. It shows that OASM produces considerably more accurate segmentations than the basic ASM method.

TABLE IV

Mean and standard deviation of TPVF and FPVF for ASM and OASM

| Data Set | TPVF for ASM | TPVF for OASM | FPVF for ASM | FPVF for OASM |
|---|---|---|---|---|
| (1) Talus | 97.94 ± 1.11 | 99.34 ± 0.14 | 0.56 ± 0.05 | 0.33 ± 0.05 |
| (2) Calcaneus | 96.53 ± 1.23 | 98.87 ± 0.23 | 0.70 ± 0.04 | 0.54 ± 0.04 |
| (3) Breast | 97.56 ± 1.05 | 99.43 ± 0.22 | 0.45 ± 0.03 | 0.31 ± 0.02 |
| (4) Liver | 96.13 ± 1.43 | 99.34 ± 0.21 | 0.60 ± 0.05 | 0.32 ± 0.03 |
| (5) Cervical Vertebra | 94.72 ± 2.01 | 99.08 ± 0.20 | 0.76 ± 0.03 | 0.41 ± 0.03 |

Both methods are implemented on an Intel Pentium IV PC with a 3.4 GHZ CPU. In determining the efficiency of a segmentation method, two aspects should be considered—the computation time (Tc) and the human operator time (To). The mean Tc, and To per data set estimated over the 20 test data sets for each experiment are listed in Table V.

TABLE V

Mean operator time To and computational time Tc (in seconds) in all experiments by using ASM and OASM

| Data Set | To for ASM | To for OASM | Tc for ASM | Tc for OASM |
|---|---|---|---|---|
| (1) Talus | 16 s (n = 30) | 6 s (n = 10) | 4 s | 9 s |
| (2) Calcaneus | 19 s (n = 36) | 7 s (n = 20) | 6 s | 10 s |
| (3) Breast | 14 s (n = 18) | 5 s (n = 9) | 4 s | 9 s |
| (4) Liver | 19 s (n = 30) | 7 s (n = 11) | 5 s | 12 s |
| (5) Cervical Vertebra | 22 s (n = 96) | 10 s (n = 28) | 8 s | 15 s |

In Table V, To is the measured operator time required in the training step. Table V shows that the operator time required in OASM is much less than that of ASM since far fewer landmarks are needed in OASM. The computation time required in OASM is a little more than that of ASM because of the 2LDP algorithm in OASM. We note that the operator time required in all experiments is not unreasonable, and neither is the computational time. A multivariate analysis of variance test was applied to statistically compare OASM with ASM based on all five efficacy measures: PR, TPVF, FPVF, To, and Tc. The MANOVA test of the 20 metric values in each of six groups with a p<0.05 indicates that the two methods produce different precision, accuracy, and efficiency in the overall level. Subsequently, paired t-tests conducted with p<0.05 indicate that the OASM method produces better precision (PR), accuracy (TPVF, FPVF), and efficiency on operator time (To) than the basic ASM method, but ASM produces better efficiency on computation time (Tc) than the OASM method. However, the decrease in operator time is well worth the increase in computational time.

The present invention puts forth a dual recognition-delineation paradigm for image segmentation. Based on the premise that model-based methods are stronger in recognition but weaker in delineation and vice versa for purely image-based methods, the present invention presents an approach that exploits the strength of one in overcoming the weakness of the other synergistically. Although the presented approach, called OASM, is specifically for combining the ASM model-based approach with the live wire image-based approach, the principles underlying this approach carries over to a variety of situations to create more effective hybrid approaches. When anchor points or landmarks are specified near the boundary of an item of interest, live wire is very effective in delineating boundaries as globally optimal oriented boundary segments. This landmark (point) information is supplied, via the act of recognition, by ASM in OASM as opposed to by a human operator in live wire. Further, live wire, via the cost structure K of the optimal oriented boundary, helps ASM in the recognition process itself by yielding sharp and specific boundary information derived from the particular image. This synergy is important in boundary recognition in automatic initialization because the information contained in ASM is, by necessity, blurred due to the statistical averaging process. K is part of the oriented model (M, K). K truly imposes orientedness in a global manner on M. As demonstrated via automatic initialization, (M, K) is very powerful in automatic boundary recognition; M alone cannot recognize objects as effectively. In this manner, live wire empowers M in OASM in recognition. Similarly, for live wire, the oriented model (M, K) is needed: (1) to bring the landmarks sufficiently close to the boundary, and (2) to make sure that the minimum cost boundary belongs to the same shape class. This is the synergy that OASM embodies and exploits. Thus the two methods support each other in improving both recognition and delineation in OASM. As a result: (1) OASM improves over ASM significantly in segmentation accuracy, achieving at least 99% agreement with manual tracing and not greater than 0.5% FPVF. (2) OASM improves over ASM in its precision to search region. (3) OASM requires far fewer landmarks (about ⅓ of ASM) than ASM. (4) And compared to live wire, OASM achieves a full automation while agreeing with its results very closely.

The various techniques described herein may be implemented in connection with hardware or software or, where appropriate, with a combination of both. Thus, the methods and apparatus of the invention, or certain aspects or portions thereof, may take the form of program code (i.e., instructions) embodied in tangible media, such as floppy diskettes, CD-ROMs, hard drives, or any other machine-readable storage medium, wherein, when the program code is loaded into and executed by a machine, such as a computer, the machine becomes an apparatus for practicing the invention.

While aspects of the present invention has been described in connection with the preferred embodiments of the various figures, it is to be understood that other similar embodiments may be used or modifications and additions may be made to the described embodiment for performing the same function of the present invention without deviating there from. Furthermore, it should be emphasized that a variety of computer platforms, including handheld device operating systems and other application specific operating systems are contemplated, especially as the number of wireless networked devices continues to proliferate. Therefore, the claimed invention should not be limited to any single embodiment, but rather should be construed in breadth and scope in accordance with the appended claims.

What is claimed:

1. A method for the interactive segmentation of medical image slice data using a computer, the method comprising:
   (a) displaying an image of a training shape comprising a two dimensional medical image training slice;
   (b) applying a set of initial landmarks on a boundary of a training object of interest on the training shape;
   (c) generating an active shape model using the initial landmarks;
   (d) manually tracing segments of typical boundaries of the object of interest to train a boundary cost function;
   (e) generating an oriented active shape model using the active shape model and the boundary cost function;
   (f) selecting an input image slice of a set of target medical image slices and displaying a first target slice;
   (g) recognizing a shape of a target object of interest in the input image slice by applying landmarks from the oriented active shape model and automatically specifying an initial position of the target shape on the input image slice;
   (h) determining positions of new landmarks on the target object;
   (i) generating a new shape representing the target object using the new landmarks on the target object; and
   (j) displaying the new shape of the target object on the target medical input image slice, wherein the new shape closely conforms with the boundaries of the target object.

2. The method of claim 1, wherein steps (a) and (b) are repeated using medical image training slices having a similar object of interest from a plurality of different patients before performing step (c).

3. The method of claim 1, wherein steps (a) through (e) are performed generating a plurality of oriented active shape models.

4. The method of claim 3, wherein recognizing a shape of a target object of interest in the input image slice further comprises testing different oriented active shape models and selecting one model having a lowest cost function for the target object.

5. The method of claim 1, wherein determining positions of new landmarks on the target object comprises calculating a smallest sum of costs of minimum cost oriented paths of successive landmarks.

6. The method of claim 1, wherein the steps of (h) and (i) comprise:
   determining sets of points defined as points on either side of the initial landmarks that are positioned along a line perpendicular to the shape of the target object of interest;
   determining a cost for an oriented path of directed arcs relative to each initial landmark;
   determining a minimum directed path around the target object of interest;
   determining a new shape corresponding to the minimum directed path and a corresponding minimum cost; and
   outputting the new shape along with the corresponding oriented boundary.

7. The method of claim 1, wherein steps, (h) and (i) are repeated iteratively until a new shape converges.

8. The method of claim 1, wherein the step of generating an active shape model comprises generating an active shape model using the initial landmarks on the training shape, a mean shape vector, a shape covariance matrix, and eigenvectors for the covariance matrix.

9. The method of claim 1, wherein computing a minimum cost of a boundary cost function comprises computing the boundary cost function using the initial landmarks as anchor points in a live wire method and computing cost functions between the anchor points.

10. The method of claim 1, further comprising:
    (k) selecting a second slice image of the set of target medical images and displaying the second slice;
    (l) applying steps (g)-(i), wherein the target object is a second target object; and
    (m) displaying a new shape of the second target object superimposed on the display of the second slice.

11. A computer system for the interactive segmentation of a medical image, the system comprising:
    a user interface to display slices of medical images obtained using medical image scanning equipment;
    an image data store for storing the medical images;
    an image processing computer having access to memory, the memory having stored thereon at least one oriented active shape model having shapes and landmarks of a medical image;
    a computer program executed by the image processing computer that segments medical image data, the computer program performing the steps of:
    (a) selecting an image slice of a set of target medical image slices and displaying a first target slice on the user interface;

(b) recognizing a shape of a target object of interest in the first slice by applying the landmarks from the at least one active shape model and automatically specifying an initial position of the target shape on the first slice, the oriented active shape model having a statistical shape model and an oriented boundary cost structure for the statistical shape model;

(c) determining sets of points defined as points on either side of the initial landmarks that are positioned along a line perpendicular to the shape of the target object of interest;

(d) determining a cost for an oriented path of directed arcs relative to each initial landmark;

(e) determining a minimum directed path around the target object of interest;

(f) determining a new shape corresponding to the minimum directed path and a corresponding minimum cost;

(g) outputting the new shape along with the corresponding oriented boundary using the new landmarks on the target object; and (h) displaying the new shape of the target object on the target medical image slice, wherein the new shape closely conforms with the boundaries of the target object.

12. The system of claim 11, wherein the image processing computer executes computer program steps (c) through (g) iteratively until a new shape converges.

13. The system of claim 11, wherein the image processing computer further executes computer program steps comprising:

(i) selecting a second slice of the set of target medical images and displaying the second slice;

(j) applying steps (c)-(g), wherein the target object is a second target object; and (k) displaying a new shape of the second target object superimposed on the display of the second slice.

14. A computer-readable tangible storage medium having stored thereon instructions executable by a computer to perform steps for segmentation of image data, the instructions, when executed, performing the steps of:

(a) selecting an image slice of a set of target medical image slices and displaying a first target slice;

(b) recognizing a shape of a target object of interest in the first slice by applying landmarks from an oriented active shape model and automatically specifying an initial position of the target shape on the first slice, the oriented active shape model having a statistical shape model and an oriented boundary cost structure for the statistical shape model;

(c) determining sets of points defined as points on either side of the initial landmarks that are positioned along a line perpendicular to the shape of the target object of interest;

(d) determining a cost for an oriented path of directed arcs relative to each initial landmark;

(e) determining a minimum directed path around the target object of interest;

(f) determining a new shape corresponding to the minimum directed path and a corresponding minimum cost;

(g) outputting the new shape along with the corresponding oriented boundary using the new landmarks on the target object; and (h) displaying the new shape of the target object on the target medical image slice, wherein the new shape closely conforms with the boundaries of the target object.

15. The computer-readable medium of claim 14, further comprising the step of:

(i) selecting a second slice of the set of target medical images and displaying the second slice;

(j) applying steps (c)-(g), wherein the target object is a second target object; and (k) displaying a new shape of the second target object superimposed on the display of the second slice.

16. The computer-readable medium of claim 14, wherein steps, (c)-(g) are repeated iteratively until a new shape converges.

* * * * *